Patented Mar. 8, 1938

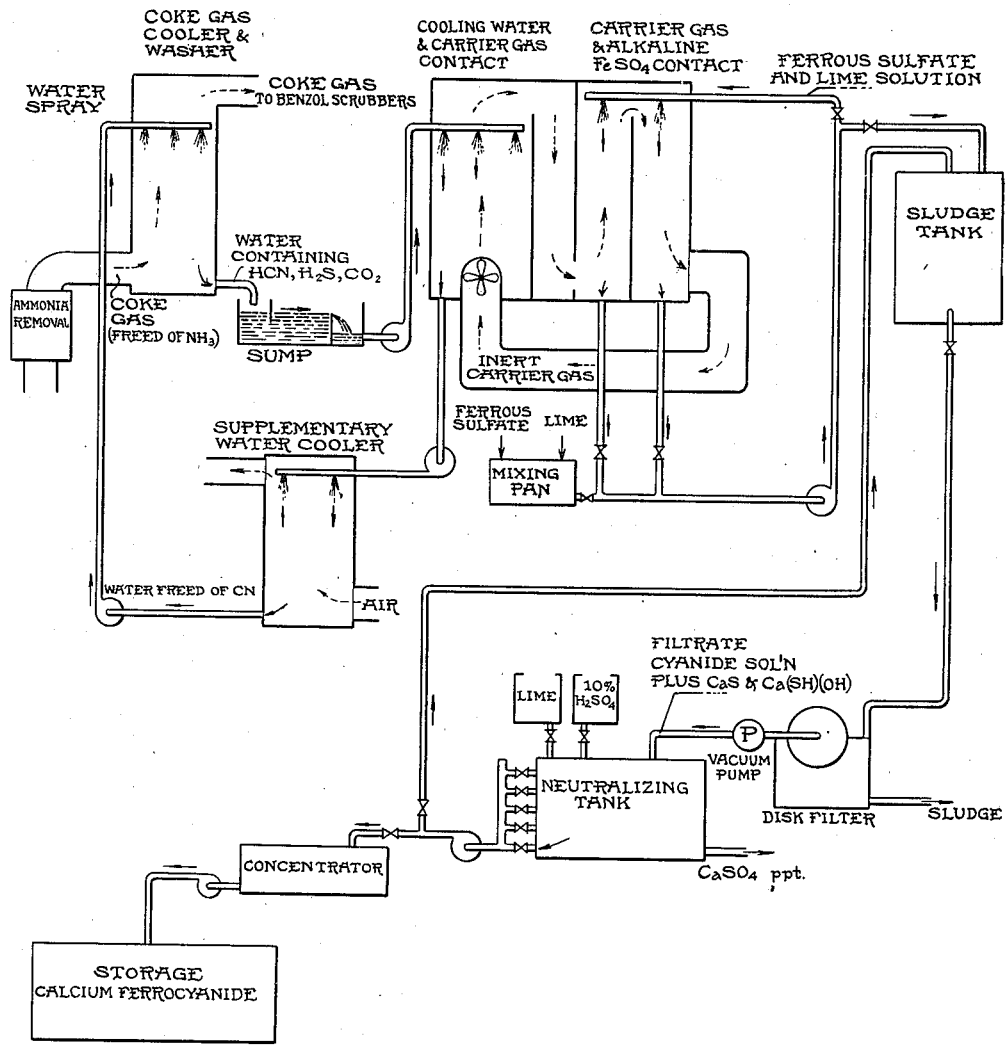

2,110,244

UNITED STATES PATENT OFFICE 2,110,244

RECOVERING CYANOGEN COMPOUNDS

Fredrick D. Schreiber, Dormont, Pa.

Application March 12, 1937, Serial No. 130,579

5 Claims. (Cl. 23—76)

This invention or discovery relates to recovering cyanogen compounds; and it comprises a method of recovering cyanides from gases containing them, which comprises bringing the gas into contact with a circulating flow of water so as to extract HCN, and incidentally $H_2S$ and $CO_2$, from the gas, bringing said flow of water into contact with a circulating current of substantially oxygen-free inert carrier gas containing $H_2S$ and $CO_2$ whereby to abstract HCN and $H_2S$ from the circulating water, passing said circulating current of carrier gas in contact with a circulating body of alkaline liquid, adding lime and a ferrous compound to said circulating alkaline liquid at a point separated from the contact of the liquid with the carrier gas, so as to convert cyanide in the liquid to alkali ferrocyanide, and diverting a portion of said circulating body for crystallization of ferrocyanide therein; all as more fully hereinafter set forth and as claimed.

In the manufacture of gas and coke by distilling coal, recovery of byproducts aids materially in defraying the cost of operation. The main commercial byproducts are tar, light oils (benzol) and ammonia ($NH_3$).

In the ordinary routine of purifying gas and recovering byproducts therefrom, the gas is first cooled to condense tar and some of the oils and is then reheated and passed through sulfuric acid which abstracts and retains contained ammonia as ammonium sulphate. The heat of the gas and that produced by the neutralization of the acid keep the liquor hot. Ammonium sulphate crystallizes out and a concentrated magma of crystals and mother liquor is removed from time to time. The hot gas leaves the sulfuric acid saturator free of ammonia but containing much water vapor and various gases of more or less acid nature including HCN, $H_2S$ and $CO_2$. It is customary to cool the gas by a cold water spray thereby condensing out most of the water vapor prior to passage of the gas to further purifying operations. The cooling water leaves the system warm (at about 35° C.) and containing some of the acid gases in solution. It is ordinarily discarded and its disposal is often troublesome. Sometimes the cooling water is blown with air to cool it by evaporation, and returned to the gas cooler or sprayer. In this case the air carries off most of the HCN, $H_2S$ and $CO_2$ from the water.

Coal gas carries HCN, or ammonium cyanide, as a minor constituent. The proportion is so small that direct treatment of the gas for its recovery is not considered worth while, apart from the undesirability of interfering with the standardized routine of plant operation. The HCN in coal gas has been considered an annoying impurity, not generally worth the cost of recovery, but difficult to get rid of otherwise than by sending it to waste with the cooling water. Nevertheless, the total amount of fixed nitrogen as cyanide going to waste daily in a large coking or gas plant is considerable. In a typical plant it may amount to 1500 pounds of cyanides (as HCN) per day for each 2000 tons of coal used.

I have discovered that the major part of this cyanogen can be inexpensively recovered with the regular routine of the plant by a special treatment of the cooling water. In the cooling water it is contained in too small a percentage to permit the application of direct recovery methods, but I have discovered that I can, so to speak blow it out from the cooling water by a current of inert gases, usually some of the combustible gas from the plant operation. While HCN is soluble in water it has little affinity therefor and it is readily blown out. It will be noted that in this operation there is no disturbance of the routine of the plant. From the current of gas used in blowing out HCN from the warm scrubbing water, the HCN and cyanogen compounds can be recovered in commercially available form as a ferrocyanide.

The inert gas is used cyclically and in so doing it builds up to a definite content of $CO_2$ and $H_2S$. In the operation of the system it removes most of the HCN from the cooling water. The rest can be removed from the cooling water by a supplemental air blowing, fitting the cooling water for reuse.

The carrier gas, now containing most of the cyanide, is scrubbed with a circulating aqueous solution of ferrous sulphate (or other ferrous compound) and a base, advantageously hydrated lime, $Ca(OH)_2$. Alkaline ferrous compounds are quickly oxidized by oxygen and a carrier gas is used containing no free oxygen. The cyanide is thereby recovered from the carrier gas as dissolved calcium ferrocyanide. The carrier gas is now returned to the cooling-water scrubber in closed circulation. On contact with the carrier gas, some of the lime reacts with the $H_2S$ to form hydrated calcium sulphide, but this compound is basic in its reaction and acts in the same manner as $Ca(OH)_2$ to form calcium ferrocyanide. The $H_2S$ is only temporarily fixed. Some of the $Ca(OH)_2$ is converted to $CaCO_3$ by the $CO_2$. This does not react with HCN but forms a sludge. Any CN, H₂S and CO₂ unabsorbed in the alkaline ferrous sulphate solution are recirculated in the carrier gas.

The calcium ferrocyanide content of the circulating alkaline liquor gradually builds up. From time to time or continuously a portion of the circulating liquor is purged off and ferrocyanide recovered therefrom as described post.

The process thus comprises three interlocked circulations: a cooling water circulation interlocked with an inert gas circulation, the inert gas circulation being interlocked with an alkali-ferrous-sulphate liquor circulation.

In the accompanying drawing I have shown diagrammatically, in the manner of a flow sheet, an apparatus arrangement illustrating the manner in which the invention is carried out.

Referring to the drawing, in which the showing of the apparatus elements is simplified for the sake of clarity of presentation: coke gas coming from known tar and ammonia-water removal means (not shown) passes through a sulphuric acid saturator wherein it is heated and ammonia gas is extracted in a way known per se. The hot gas passes into the lower portion of a spray cooler and washer. At this point the gas, under typical conditions, contains about 80 grains of HCN, 400 grains of H₂S and 400 grains of CO₂ per 100 cubic feet. The gas is washed and cooled by sprays of cold water introduced at the top of the cooler as shown. With proper adjustment of temperature and time of contact, most of the CN is removed from the gas, and only small amounts of H₂S and CO₂. Thus under properly regulated conditions the gas leaving the washer at the top will contain about 5 to 10 grains HCN, 390 grains H₂S and 390 grains CO₂ per cubic foot. The wash water holds these gases in solution in these small concentrations. The gas is cooled by the water spray from an initial temperature around 55°–60° C. to a temperature of around 20°–30° C.; the values depending largely on the season of the year. The water leaves the cooler at a temperature of around 30°–35° C.

The wash water is continuously drawn off into a sump whence it is pumped to a closed recovery system which advantageously takes the form of a series of closed towers. The water is sprayed into the top of the first tower, and at the bottom is introduced a flow of inert carrier gas, free of oxygen but containing H₂S and CO₂. In this countercurrent contact the gas takes up the HCN from the cooling water.

In the drawing, gas flows are indicated by dotted arrows and liquid flows by solid arrows.

The carrier gas can conveniently be scrubbed coke oven gas, diverted from the main flow. Prior to operations, the towers are swept out with the inert gas to remove air therefrom.

The volume of this circulated carrier gas may be varied by changing the speed of a fan that circulates the gases through the system. This gas leaving the top of the water section will now have a HCN content of about 50 grains per 100 cubic feet, while the CO₂ and H₂S content will each be about 7 grains per 100 cubic feet. These proportions ordinarily remain practically constant but the concentration may be varied. It is to be noted that these concentrations are very unlike those in the original coke oven gas, wherein the concentrations are about 80 grains per 100 cubic feet HCN, 400 grains per 100 cubic feet H₂S and 400 grains per 100 cubic feet of CO₂. It is necessary to put these concentrations in such a relation to each other that the removal with the selected absorbent medium will be successful.

Cooling water leaving the first tower is recirculated back to the raw coke gas washer. If desired, the water can be further cooled, prior to reintroduction into the washer, as by a conventional spray cooling means, shown in the drawing.

The carrier gases now leaving the top of the water section with the desired concentration and proportions of HCN, H₂S and CO₂ are now passed into a second or absorbing section of this closed system where absorption takes place. In this section these gases are sprayed in countercurrent with a solution of milk of lime, Ca(OH)₂, in which ferrous sulphate (FeSO₄7H₂O) has been precipitated. In this solution the lime is in considerable excess. The amounts used are in the proportion of 400 pounds of CaO to 200 pounds of Fe₂SO₄7H₂O.

The HCN is absorbed and converted to calcium ferrocyanide in solution. There is also formed Ca(SH)(OH) (calcium sulphohydrate); FeS (iron sulphide); CaS (calcium sulphide); CaSO₄ (calcium sulphate); CaCO₃ (calcium carbonate), and probably other compounds. Formation of calcium sulphocyanide is suppressed, by reason of the inert character of the circulating gas.

This solution is circulated for the desired time, to cause the cyanide content to build up, and are then replaced with a fresh alkaline ferrous sulphate solution. The gases passing out of this section contain residual HCN, H₂S and CO₂. They are passed back again into the bottom of the water section where the H₂S and CO₂ drive out more HCN from the water. By making numerous passes through this system the HCN which is not absorbed in one pass may again be passed through the absorbing medium. This is an important feature in my method of recovery. In direct scrubbing of gas this recycling of the gas to be scrubbed is not possible.

The solution removed from the scrubbing section and containing the valuable calcium ferrocyanide in solution is treated as follows: The entire solution is passed through a suitable filter, e. g. a disk filter, to remove precipitated matter; mostly calcium carbonate, calcium sulphate, iron sulphate and iron hydroxide. As the solution is kept sufficiently alkaline at all times there are no insoluble iron cyanide compounds present. The clear filtrate from the filter is now made slightly acid with dilute (e. g. 10 per cent) sulphuric acid. The acid reacts with the excess lime to form CaSO₄ and with the calcium sulphohydrate to form CaSO₄ and H₂S. This acid treatment is advantageous in the working up of the solution as it prevents the precipitation of CaSO₄ when evaporating the solution and prevents the formation of sulphocyanides from the calcium ferrocyanide by the action of H₂S which would otherwise be given off during evaporation.

The solution after being made acid is made slightly alkaline with lime. The solution now is again filtered to remove the CaSO₄ precipitated by the acid treatment and also the excess lime. The solution of calcium ferrocyanide is now evaporated to the desired strength. This is usually about 35° Baumé.

If desired, other alkaline reagents can be used in lieu of lime; for example sodium carbonate. I regard lime as better, however, because of its caustic properties, and the fact that it forms an insoluble sulphate readily separable from the solution of calcium ferrocyanide. When sodium carbonate is used, the sodium sulphate formed must be separated from the ferrocyanide by fractional crystallization.

The ferrous iron required in the process can be supplied by ferrous compounds other than ferrous sulphate. Ferrous salts generally, e. g. ferrous chloride, are useful. Ferrous hydroxide can be employed. Since the circulating alkaline-ferrous compound solution is kept from contact with the air, there is no tendency for ferrous hydroxide (when used) to oxidize to ferric oxide.

While the process has been described in connection with washing coal or coke gas and extracting cyanides therefrom, it can also be applied, with the necessary slight modification, to recovery of cyanides from other gases containing cyanides. Furthermore, the dilute aqueous cyanide solution, described as produced by washing the coal gas, may be derived from other sources; the cyanides being recovered therefrom by circulation in contact with the body of inert carrier gas and alkaline-ferrous-sulphate treatment as described.

Reference is made to my related copending application Ser. No. 742,309, filed August 31, 1934, for Purifying coke oven gas.

What I claim is:—

1. In recovering HCN from gases containing them, the process which comprises bringing the gas in contact with a circulating flow of water whereby to extract HCN and incidentally $H_2S$ and $CO_2$ therefrom, bringing said circulating flow of water in contact with a circulating current of a carrier gas substantially free of oxygen and containing $H_2S$ and $CO_2$, whereby to abstract HCN from the water, passing said circulating current of carrier gas in contact with a circulating body of alkaline liquid, passing said circulating body through replenishing means and adding to it therein alkali and a ferrous compound, whereby cyanide taken up from the carrier gas is converted to alkali ferrocyanide, and diverting a portion of said circulating body of liquid for crystallization of ferrocyanide therefrom.

2. In purifying coke oven gas, the process of recovering fixed nitrogen therefrom which comprises scrubbing the gas with hot sulphuric acid solution to remove ammonia therefrom, bringing the hot gas in contact with a circulating flow of water to cool the gas and extract HCN and $H_2S$ and $CO_2$ therefrom, bringing said circulating flow of water in contact with a circulating body of substantially $O_2$-free and $CO_2$ free inert carrier gas containing $H_2S$, whereby to abstract HCN from the water, passing said circulating body of carrier gas in contact with a circulating body of alkaline liquid, passing said circulating body through replenishing means and adding to the body therein, alkali and a ferrous compound so as to convert cyanide therein to alkali ferrocyanide, and diverting a portion of said circulating body of liquid for crystallization of ferrocyanide therefrom.

3. In recovering HCN from a dilute aqueous solution thereof, the process which comprises scrubbing said aqueous solution with a circulating body of an oxygen-free carrier gas containing $H_2S$ and $CO_2$, whereby to abstract HCN from the solution, passing said circulating body of carrier gas in contact with a circulating body of an alkaline ferrous compound solution, adding alkali and a ferrous compound to said circulating body to convert cyanide to alkali ferrocyanide and diverting a portion of said circulating body of liquid for crystallization of ferrocyanide therefrom.

4. The method of recovering HCN from a gas containing it, which comprises contacting a flow of the gas with a recirculated body of water which absorbs HCN from the gas and is then brought into contact with a current of inert carrier gas which removes HCN therefrom, the said carrier gas being substantially free from oxygen but containing $H_2S$ and $CO_2$, recirculating the carrier gas through the stage where it removes HCN from the circulating body of water and through a stage where it contacts an alkaline liquid which absorbs HCN, circulating the alkaline liquid through the stage where it absorbs HCN from the carrier gas and through a stage where an alkali and a ferrous compound are added thereto to form alkali ferrocyanide with the absorbed HCN, and withdrawing alkaline liquid from circulation and recovering alkali ferrocyanide therefrom.

5. In recovering HCN from a dilute aqueous solution thereof, the combination of steps comprising scrubbing said aqueous solution with a recirculating body of an oxygen-free carrier gas which removes HCN from the solution, passing said circulating body of carrier gas into intimate contact with a circulating body of an alkaline solution which absorbs HCN therefrom and returning the gas into contact with a further quantity of said aqueous solution, adding hydrated lime and a ferrous compound to said circulating body of alkaline solution to convert HCN absorbed therein to calcium ferrocyanide, withdrawing portions of said solution and recovering crystalline calcium ferrocyanide therefrom.

FREDRICK D. SCHREIBER.